(12) United States Patent
Kahlman et al.

(10) Patent No.: US 8,927,446 B2
(45) Date of Patent: Jan. 6, 2015

(54) ZIRCONIA-ALUMINA CERAMIC MATERIALS

(75) Inventors: Lars Kahlman, Partille (SE); Charlotte Vieillard, Nieuwegein (NL); Jelena Sekulic, Nieuwegein (NL); Knut Henrik Johansen, Kristiansand (NO); Hans Hillen Schjelderup, Vagsbygd (NO)

(73) Assignee: Aktiebolaget SKF, Gothenburg (SE)

( * ) Notice: Subject to any disclaimer, the term of this patent is extended or adjusted under 35 U.S.C. 154(b) by 230 days.

(21) Appl. No.: 13/381,501

(22) PCT Filed: Jun. 30, 2009

(86) PCT No.: PCT/EP2009/004702
§ 371 (c)(1),
(2), (4) Date: Mar. 15, 2012

(87) PCT Pub. No.: WO2011/000390
PCT Pub. Date: Jan. 6, 2011

(65) Prior Publication Data
US 2012/0163744 A1 Jun. 28, 2012

(51) Int. Cl.
*C04B 35/119* (2006.01)
(Continued)

(52) U.S. Cl.
CPC ............ *C04B 35/4885* (2013.01); *C04B 35/119* (2013.01); *C04B 35/62655* (2013.01);
(Continued)

(58) Field of Classification Search
CPC .. C04B 35/119; C04B 35/4885; C04B 35/44; F16C 33/121; F16C 33/303; C02C 38/01; C02C 38/02; C02C 38/22; C02C 38/24
USPC .................. 501/105; 420/12; 384/492, 907.1
See application file for complete search history.

(56) References Cited

U.S. PATENT DOCUMENTS

| 4,316,964 A | 2/1982 | Lange |
| 4,820,666 A | 4/1989 | Hirano et al. |

(Continued)

FOREIGN PATENT DOCUMENTS

| CN | 1165252 A | 11/1997 |
| CN | 101107205 A | 1/2008 |

(Continued)

OTHER PUBLICATIONS

Japanese Office Action (Reasons) dated Jul. 2, 2013, issued by the Japanese Patent Office in corresponding Japanese Patent Application No. 2012-518022, and English language translation of Office Action. (7 pages).

(Continued)

*Primary Examiner* — Karl Group
(74) *Attorney, Agent, or Firm* — Buchanan Ingersoll & Rooney PC

(57) ABSTRACT

The present invention provides a ceramic material comprising: a first phase comprising zirconia, yttrium and cerium, wherein the yttrium and cerium are present in a molar ratio of 0.15 to 0.5 and in a combined amount of 5 to 15 mol %, a second phase comprising alumina, and a third phase comprising metal aluminate platelets.

10 Claims, 1 Drawing Sheet

(51) Int. Cl.
*F16C 33/32* (2006.01)
*F16C 33/58* (2006.01)
*C04B 35/488* (2006.01)
*C04B 35/626* (2006.01)
*C04B 35/645* (2006.01)
*C22C 33/02* (2006.01)
*C22C 38/00* (2006.01)
*C22C 38/02* (2006.01)
*C22C 38/04* (2006.01)
*C22C 38/22* (2006.01)
*C22C 38/24* (2006.01)
*B22F 9/08* (2006.01)

(52) U.S. Cl.
CPC ........ *C04B 35/6455* (2013.01); *C22C 33/0285* (2013.01); *C22C 38/001* (2013.01); *C22C 38/02* (2013.01); *C22C 38/04* (2013.01); *C22C 38/22* (2013.01); *C22C 38/24* (2013.01); *B22F 2009/0824* (2013.01); *B22F 2998/10* (2013.01); *C04B 2235/3213* (2013.01); *C04B 2235/3222* (2013.01); *C04B 2235/3225* (2013.01); *C04B 2235/3227* (2013.01); *C04B 2235/3229* (2013.01); *C04B 2235/3246* (2013.01); *C04B 2235/3248* (2013.01); *C04B 2235/6027* (2013.01); *C04B 2235/608* (2013.01); *C04B 2235/661* (2013.01); *C04B 2235/765* (2013.01); *C04B 2235/77* (2013.01); *C04B 2235/786* (2013.01); *C04B 2235/788* (2013.01); *C04B 2235/80* (2013.01); *C04B 2235/96* (2013.01); *C04B 2235/9684* (2013.01); *C04B 2235/9692* (2013.01); *Y10S 384/9071* (2013.01)
USPC .......... 501/105; 420/12; 384/492; 384/907.1

(56) References Cited

U.S. PATENT DOCUMENTS

| | | | |
|---|---|---|---|
| 5,002,911 A | | 3/1991 | Matsumoto et al. |
| 5,967,670 A | | 10/1999 | Gabelli et al. |
| 6,174,089 B1 * | | 1/2001 | Kitamura et al. ............. 384/492 |
| 8,025,839 B2 * | | 9/2011 | Jonson et al. ................... 420/65 |
| 8,440,136 B2 * | | 5/2013 | Jonson et al. ................... 420/12 |
| 2002/0168125 A1 | | 11/2002 | Kahlman et al. |
| 2009/0292366 A1 * | | 11/2009 | Burger et al. .............. 623/23.56 |
| 2009/0317767 A1 * | | 12/2009 | Burger et al. .............. 433/201.1 |
| 2010/0152018 A1 * | | 6/2010 | Kuntz et al. ................... 501/104 |
| 2012/0123421 A1 * | | 5/2012 | Preuss et al. .................... 606/88 |
| 2012/0252656 A1 * | | 10/2012 | Kuntz et al. ................... 501/135 |

FOREIGN PATENT DOCUMENTS

| | | |
|---|---|---|
| EP | 1 217 235 A2 | 6/2002 |
| EP | 1 845 072 A1 | 10/2007 |
| JP | 61-219756 A | 9/1986 |
| JP | 04-504559 A | 8/1992 |
| JP | 10-047352 A | 2/1998 |
| JP | 10-194743 A | 7/1998 |
| JP | 11-223220 A | 8/1999 |
| JP | 2002-213455 A | 7/2002 |
| JP | 2004-075532 A | 3/2004 |
| JP | 2004-169723 A | 6/2004 |
| JP | 2005-008435 A | 1/2005 |
| JP | 2006-104024 A | 4/2006 |
| JP | 2009-506209 A | 2/2009 |
| WO | 90/11980 A1 | 10/1990 |
| WO | WO 90/11980 A1 | 10/1990 |
| WO | 2007024192 * | 3/2007 |
| WO | WO 2008/040813 A1 | 4/2008 |

OTHER PUBLICATIONS

Tsukuma et al., "Mechanical Property and Microstructure of TZP and TZP/AL203 Composites", Material Research Society Symposium Proceedings, 1987, pp. 123-135, vol. 78.

International Search Report (PCT/ISA/210) issued on May 27, 2010, by European Patent Office as the International Searching Authority for International Application No. PCT/EP2009/004702.

Written Opinion (PCT/ISA/237) issued on May 27, 2010, by European Patent Office as the International Searching Authority for International Application No. PCT/EP2009/004702.

Miura et al., "Formation of plate-like lanthanum-β-Aluminate crystal in Ce-TZP matrix", Journal of Materials Science, Jan. 1994, pp. 262-268, vol. 29.

English translation of Chinese Second Office Action dated Feb. 21, 2014 issued in the corresponding Chinese Patent Application No. 200980161175.8 (8 pages).

English translation of Japanese Office Action dated Jul. 8, 2014 issued in the corresponding Japanese Patent Application No. 2012-518022 (3 pages).

* cited by examiner

ZIRCONIA-ALUMINA CERAMIC MATERIALS

The present invention relates to ceramic materials containing both zirconia and alumina. These materials may be useful in, for example, bearing applications.

BACKGROUND TO THE INVENTION

Zirconia ($ZrO_2$) has three crystallographic forms. Its naturally occurring crystalline form is monoclinic zirconia, which is stable at 1 atmosphere pressure up to temperatures of about 1170° C. Between about 1170° C. and about 2370° C., the stable phase is tetragonal zirconia. Above about 2370° C., the stable phase is cubic zirconia. The different phases of zirconia can be identified by techniques well known in the art, for example by X-ray diffraction. For example, U.S. Pat. No. 4,316,964 describes how 2θ scans between 27 and 33° can be used to determine the ratio of tetragonal to monoclinic zirconia phases and scans between 55° and 62° can be used to determine the tetragonal or cubic zirconia structure.

The different phases of crystalline zirconia may be stabilized by adding certain stabilizing elements to the zirconia. For example, U.S. Pat. No. 4,316,964 describes how the tetragonal and cubic phases of zirconia may be provided in a meta-stable form at room temperature when the zirconia is doped with a dopant. The most common stabilizing elements include magnesium (Mg), calcium (Ca) and rare earth elements such as cerium (Ce), yttrium (Y), Erbium (Er), Ytterbium (Yb), dysprosium (Dy), titanium (Ti) and Hafnium (Hf).

Introducing these stabilizing elements into zirconia may be achieved by heating it with, for example, an oxide of a stabilizing element. Thus, for example, $CeO_2$, $Y_2O_3$, $Ca_2O_3$, $Er_2O_3$, $Yb_2O_3$.$Dy_2O_3$, $TiO_2$, $HfO_2$, MgO and CaO may be added to the zirconia. Typically, stabilization in this way results in the formation of a solid solution of the stabilizing element(s) in the zirconia.

The different phases of crystalline zirconia are known to exhibit different properties. For example, tetragonal zirconia is known to exhibit high toughness. One explanation for this toughness of tetragonal zirconia is that, where a crack forms, the zirconia at the crack tip undergoes a phase transformation from tetragonal zirconia to monoclinic zirconia. This phase transformation is accompanied by an increase in volume of typically about 3 to 5%. This increase in volume induces a compressive stress that, in turn, acts to reduce the driving force for crack propagation. This mechanism is termed "transformation toughening" and is described in WO 90/11980.

It is also known that stabilized cubic zirconia may exhibit a similar effect when subject to cracking.

While zirconia may exhibit advantageous toughness properties by itself, it does not have ideal hardness for some applications. In view of this lack of hardness, alumina has sometimes been added to zirconia materials. When alumina and zirconia are mixed and heated, the alumina generally remains separate from the zirconia and mostly does not form a solid solution with the zirconia. An example of this approach is taken in EP 1217235.

In addition, the mechanism contributing to the toughness of zirconia is also thought to contribute to stabilized zirconia's poor retention of its mechanical properties at increasing temperatures. In particular, the stability of the tetragonal and cubic phases of zirconia increases with increasing temperature and, as a result, the tendency for phase transformation to occur at the tip of a forming crack decreases with increasing temperature. This poor retention of thermal characteristics is also addressed by the addition of alumina because, while alumina has lower strength and toughness than zirconia at ambient temperature, it retains its strength and toughness at increasing temperatures to a greater degree than zirconia. In addition, alumina has a higher thermal conductivity and lower thermal expansion than zirconia, which helps prevent thermal shock.

Separately, WO 90/11980 describes how strontium, for example provided as an oxide of strontium such as strontium oxide (SrO), does not dissolve in an alumina/zirconia mixture but instead forms a separate strontium aluminate phase. This separate phase is a discontinuous phase formed from "platelets" of strontium aluminate. The aluminate is thought to be present as $SrO.6Al_2O_3$.

SUMMARY OF THE INVENTION

The present invention provides a ceramic material comprising: a first phase comprising zirconia, yttrium and cerium, wherein the yttrium and cerium are present in a molar ratio of 0.15 to 0.5 and in a combined amount of 5 to 15 mol %, a second phase comprising alumina, and a third phase comprising metal aluminate platelets.

The present invention further provides a ceramic material consisting of: 50 to 75 wt % of a zirconia matrix, 25 to 49.5 wt % of alumina, 0.5 to 5 wt % metal aluminate platelets, and any unavoidable impurities, wherein the zirconia matrix comprises a composite of zirconia containing yttrium in an amount of 1 to 10 mol % and zirconia containing cerium in an amount of 5 to 20 mol %, wherein the yttrium-containing zirconia and the cerium-containing zirconia are present in a weight ratio of 1:3 to 1:1.

The present invention further provides a method of manufacturing a ceramic material comprising zirconia and alumina, the method comprising: spraying a slip comprising zirconia, alumina and metal aluminate platelets and/or a metal aluminate platelet precursor through a nozzle to form droplets, freeze drying or spray drying of these droplets to form granules, pressing the granules to form a green body, and sintering the green body, wherein metal aluminate platelets are formed from the, metal aluminate platelet precursor during the sintering of the green body.

The present invention further provides a roller bearing comprising an inner ring, an outer ring and at least one roller element in between the inner ring and outer ring, wherein at least a rolling surface of the roller element is formed from a ceramic material as defined herein, and the inner ring and/or outer ring is made from a steel composition comprising:

0.01-2 wt % C, 0.6-10 wt % N, 0.01-3.0 wt % Si, 0.01-10.0 wt % Mn, 16-30 wt % Cr, 0.01-5.0 wt % Mo, 0.01-15.0 wt % V, 0-5 wt % Ni, 0-5 wt % Co, 0-5 wt % W, 0-5 wt % Ti, 0-5 wt % Zr, 0-5 wt % Al, 0-0.5 wt % S, and the balance iron together with any unavoidable impurities.

DETAILED DESCRIPTION OF THE INVENTION

Figure 1:
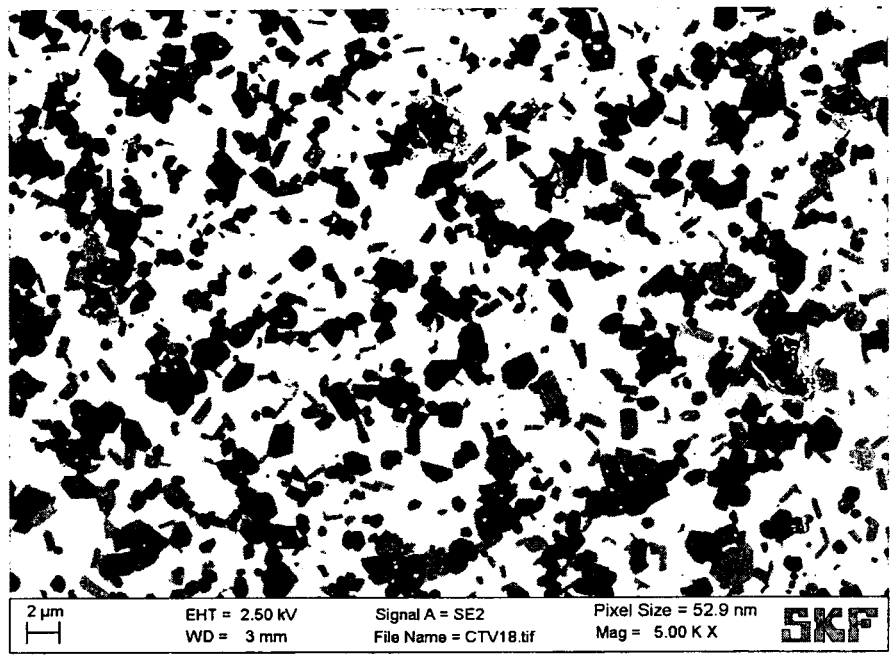
FIGS. 1 and 2 are micrographs showing microstructure of examples of the materials of the present invention.

The inventors of the present invention have recognised the need for high-performing ceramic materials for use in engineering applications. In particular, ceramic materials are useful in high load applications, such as for bearing components.

Presently, one material used in high-performance engineering applications is silicon nitride. However, the inventors have recognised that certain drawbacks associated with the use of silicon nitride, namely its impact resistance and hydrothermal and chemical stability.

The inventors have also recognised that the zirconia-based ceramics may overcome some of the drawbacks of using silicon nitride. However, the inventors have found that the zirconia-alumina ceramics proposed by the prior art may not possess all of the desirable physical properties for high-performance engineering applications.

For example, a composite of yttrium-stabilized tetragonal zirconia (Y-TZP) and alumina have been tested for use in high performance engineering applications. The inventors have found these materials to exhibit some advantageous properties desired for high performance engineering applications. However, the inventors have found that these materials suffer from reduced performance in humid environments, particularly at elevated temperatures. In other words, the inventors have found that these materials tend to suffer from poor hydrothermal stability. This may be at least in part caused by the chemical disintegration of the zirconia in humid environments.

This is illustrated by Composition A in Example 1, whose properties are listed in Table 1. This example shows that a zirconia/alumina composite where the zirconia is stabilized only by yttrium may not exhibit a desirable hydrothermal and chemical stability.

The inventors have then found that the composition of zirconia-alumina ceramic materials can be chosen to impart desirable physical characteristics on the material, so that the material may be used in high performance engineering applications. This composition is suitable for use in bearing components such as those used in a water-lubricated bearing.

In particular, the inventors have found that a zirconia-alumina composite material comprising metal aluminate platelets in a zirconia matrix containing both yttrium and cerium in a specific quantity has advantageous properties. This material comprises at least three phases, namely a first phase of a zirconia matrix, a second phase of alumina and a third phase of metal aluminate platelets.

More specifically, the zirconia of the zirconia-alumina ceramic material of the present invention contains both yttrium and cerium. The yttrium and cerium are contained in the ceramic material in a molar ratio of 0.15 to 0.5, preferably in the zirconia phase(s) of the ceramic material. In addition, the yttrium and cerium are contained in a combined amount of 5 to 15 mol %, preferably in the zirconia phase(s) of the ceramic material, the percentage expressed as a proportion of the sum of the total number of moles of zirconia and the nominal number of moles of $CeO_2$ and $Y_2O_3$. These conditions have been found by the inventors to be advantageous for the production of a ceramic material with desirable properties for a high-performance engineering material, including strength, hardness, chemical stability and rolling characteristics.

The combined mol % of yttrium and cerium may be determined as follows:

$$\frac{100 \times (2 \times \text{moles of } Y_2O_3 + \text{moles of } (CeO)_2)}{(\text{moles of } ZrO_2 + \text{moles of } Y_2O_3 + \text{moles of } (CeO)_2)}$$

in which calculation it is nominally taken that the yttrium and cerium are present in the form of their oxides in the zirconia. In other words, the calculation is carried out on an oxide basis.

As used herein, the term "ceramic" refers to an inorganic, non-metallic solid. As used herein, the terms "solid", "liquid" and "gaseous" refer to the state of matter at 25° C. and 1 atmosphere pressure unless otherwise stated. The non-metallic properties of the ceramic materials of the present invention are, for example, reflected in their low electric conductivity, for example preferably possessing an electrical resistivity of $10^{10}$ Ωm or more, such as $10^{10}$ Ωm to $10^{15}$ Ωm.

"Zirconia" refers to the oxide of zirconium having a stoichiometric (molar) ratio in its un-doped form of zirconium to oxygen of about 1:2.

Zirconia contains Zr and O and, in its stoichiometric form, may be represented by the chemical formula $ZrO_2$. Stabilized zirconia contains stabilizing elements. These stabilizing elements may be dissolved in a solid solution of the bulk $ZrO_2$ and, as such, the stabilizing elements may be considered to be present in their oxide form. These stabilizing elements may stabilize one or more phases of the zirconia, for example the tetragonal or cubic phases.

Preferably, the zirconia used in the present invention is tetragonal zirconia stabilized with yttrium and cerium.

The term "matrix" refers to a material in which other materials are dispersed.

Preferably, the yttrium and cerium are contained in the zirconia matrix in a molar ratio of 0.2 to 0.5. More preferably, the yttrium and cerium are contained in the zirconia matrix in a molar ration of 0.3 to 0.45, such as about 0.38. In particular, the inventors have found that, when the ratio of yttrium to cerium increases, the material exhibits to a greater degree the characteristics desirable for a high-performance engineering material, such as strength, hardness and rolling characteristics. However, a high ratio of yttrium to cerium may result in a reduced environmental properties, such as increased susceptibility to cracking in the presence of water.

Preferably, the yttrium and cerium are contained in the zirconia matrix in a combined amount of 7 mol % to 12 mol %, such as about 9 mol %, these percentages being expressed as a proportion of the sum of the total number of moles of zirconia and the nominal number of moles of $CeO_2$ and $Y_2O_3$. The inventors have found these amounts may contribute to the advantageous properties of the material of the present invention, such as strength, hardness and rolling characteristics.

Preferably, yttrium is contained in the zirconia matrix in an amount of 1 to 5 mol % (which is the equivalent of the zirconia containing 0.5 to 2.5 mol % of $Y_2O_3$), such as 1.5 to 4 mol %, more preferably about 2.5 mol %. These percentages are expressed as a proportion of the sum of the total number of moles of zirconia and the nominal number of moles of $CeO_2$ and $Y_2O_3$. The inventors have found these amounts may contribute to the advantageous properties of the material of the present invention, such as strength, hardness and rolling characteristics.

Preferably, cerium is contained in the zirconia matrix in an amount of 3.5 to 13 mol %, such as 5 to 10 mol %, more preferably about 7 mol %. The inventors have found these amounts to contribute to the advantageous properties of the material of the present invention, such as strength, hardness and rolling characteristics.

Preferably, the zirconia is in cubic or tetragonal form so that the zirconia may take advantage of "transformation toughening". For example, the zirconia may contain substantially no impurity phases of monoclinic zirconia, such as 0 to 5% as measured by X-ray diffraction, for example 2% or less, more preferably 1% or less, for example about 0%. More preferably, in order to increase the zirconia's toughness, the zirconia is in tetragonal form. For example, the zirconia may contain substantially no impurity phases of monoclinic zirconia or cubic zirconia. Thus, the phase purity of tetragonal form of the zirconia may be 95% to 100% as measured by X-ray diffraction, more preferably 98% or more, such as 99% or more, for example about 100%.

The zirconia matrix may be formed from a single phase containing both yttrium and cerium in the same phase or it may be formed as a composite, wherein the yttrium and cerium are contained in separate phases of the composite matrix. Accordingly, the zirconia matrix may be a composite of yttrium-containing zirconia and cerium-containing zirconia.

If the zirconia matrix is formed as a composite, it preferably comprises at least two forms of zirconia, namely (1) zirconia that contains yttrium in an amount of 1 to 10 mol %, preferably 3 to 9 mol %, and (2) zirconia that contains cerium in an amount of 5 to 20 mol %, preferably 8 to 16 mol %. For example, the matrix may comprise yttrium-containing zirconia and cerium-containing zirconia in a weight ratio of about 1:5 to about 2:1, preferably about 1:3 to about 3:2, such as about 1:2 to about 1:1, for example about 1:1.3.

The ceramic material of the present invention comprises both alumina and metal aluminate platelets. The presence of these two phases may be confirmed by scanning electron microscopy. In particular, the presence of metal aluminate platelets contributes to the toughness of the material of the present invention.

The term "alumina" refers an oxide of aluminium. In its stoichiometric form, it has a stoichiometric (molar) ratio of aluminium to oxygen of about 2:3 and may be represented by the chemical formula $Al_2O_3$.

The term "metal aluminate" refers to a phase comprising $Al_2O_3$ and a metal. A metal aluminate may, for example, have the chemical formula $M(Al_2O_3)_x$ where x is about 1 to about 10, such as about 6, or $MO_y(Al_2O_3)_x$, where y is typically about 1 to about 3, such as 1, 1.5 or 2, and x is as defined previously.

The term "platelets" refers to a discontinuous phase of material. The platelets have at least one dimension, preferably two dimensions that are greater than the other dimension. For example, the aspect ratio of the platelets may be at least about 1.5. Preferably, the aspect ratio may be about 1.5 to about 10, for example about 2 to about 5.

In order to obtain the aspect ratio, the smallest and largest dimensions of a platelet may be measured by scanning electron microscopy. In particular, a scanning electron microscope image of a cross-section of the material may be taken and the largest dimensions and smallest dimensions of each platelet appearing in the cross-section may be measured. The ratio of these measured dimensions is then calculated.

The metal aluminate platelets may comprise a metal or metal oxide in an amount of 2 to 20 mol % (the balance preferably being $Al_2O_3$). In these amounts, the metal or metal oxide may be effective at contributing to stable formation of the platelets.

The metal or metal oxide in the alumina platelets may, for example, be strontium oxide and/or lanthanum oxide. Preferably, the platelets comprise or consist of strontium aluminate and/or lanthanum aluminate, such as $SrO.6Al_2O_3$ and/or $La_2O_3.6Al_2O_3$. Preferably, the platelets are formed from strontium hexyluminate because this material particularly contributes to the toughness of the material of the present invention.

The metal aluminate platelets are preferably present in an amount of 0.5 to 10 wt % of the composition, more preferably 2 to 8 wt %, more preferably about 6 wt %. In these amounts, the platelets may be effective at contributing to the advantageous properties resulting from the inclusion of the platelets in the material of the present invention, such as an increase in toughness.

Additionally, or alternatively, the material of the present invention preferably comprises 0.5 to 10% by area of metal aluminate platelets as measured in a scanning electron microscope image of a cross-section of the material. More preferably, the material comprises 2 to 8% by area of platelets, such as about 6% by area. These amounts of platelets are thought to contribute to the toughness of the material of the present invention.

Preferably, the alumina and the metal aluminate platelets are present in a weight ratio of 2:1 to 20:1, more preferably 3:1 to 10:1, more preferably about 4.5:1. These ratios may help to contribute to the advantageous properties of the material of the present invention.

Preferably, the material comprises a majority by weight of zirconia. Preferably, the material comprises a greater amount of zirconia than alumina. Preferably, the material comprises 20 to 95 wt % of a zirconia matrix, 4.5 to 75% by weight of alumina and 0.5 to 10 wt % of metal aluminate platelets. More preferably, the material consists of or consists essentially of 50 to 75 wt % zirconia, 25 to 49.5% by weight of alumina, and 0.5 to 5 wt % metal aluminate platelets, together with any unavoidable impurities resulting from its manufacture. These proportions may contribute to the advantageous properties of the present invention, such as strength, hardness and rolling characteristics.

As well as containing a zirconia matrix, alumina and metal aluminate platelets, the material may contain other phases and unavoidable impurities. Alternatively, the material may consist essentially of zirconia, alumina and any unavoidable impurities.

The material of the present invention may be in the form of a sintered material having been subject to sintering. Sintering is known in the art to form an integral solid from a powder by heating.

Figure 2:
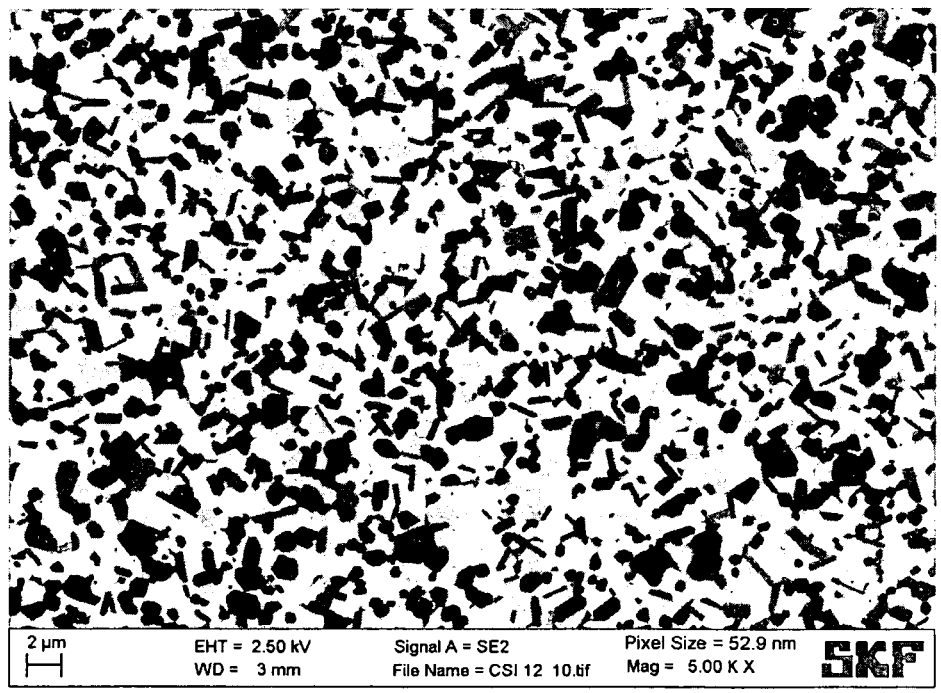

The material of the present invention, when sintered, may be considered as comprising a zirconia matrix containing both cerium and yttrium in which alumina and metal aluminate platelets are dispersed as discontinuous phases. An example of this microstructure is shown in FIGS. 1 and 2.

Preferably, substantially all of the grains in a cross-section of the material observed by scanning electron microscopy have a grain size of 10 μm or less, more preferably 5 μm or less. Accordingly, preferably at least 90% by area of the grains in a cross-section of the material observed by scanning electron microscopy have a grain size of 10 μm or less, more preferably 5 μm or less. Preferably, at least 95% by area of grains have these grain sizes, more preferably at least 98% by area, such as about 100%. In particular, these grain sizes may contribute to advantageous fatigue-life behaviour of the material.

Preferred compositions include a ceramic material comprising:
 a matrix comprising cerium-containing zirconia and yttrium stabilized zirconia, wherein the cerium-containing zirconia has a cerium content of 8 to 16 mol % cerium and is present in an amount of 35 to 45 wt % of the material, and wherein the yttrium-containing zirconia has a yttrium content of 3.0 to 9.0 mol % (i.e. 1.5 to 4.5 mol % on an $Y_2O_3$ oxide basis) and is present in an amount of 25 to 35 wt % of the material,
 20 to 30 wt % alumina, and
 3 to 8 wt % metal aluminate platelets.

A further preferred composition is a ceramic material comprising:

a matrix comprising cerium-containing zirconia and yttrium stabilized zirconia, wherein the cerium-containing zirconia has a cerium content of about 12 mol % cerium and is present in an amount of about 39 wt % of the material, and wherein the yttrium-containing zirconia has a yttrium content of about 6 mol % (i.e. 3 mol % on an $Y_2O_3$ oxide basis) and is present in an amount of about 29.5 wt % of the material, about 24.6 wt % alumina, and about 5.7 wt % metal aluminate platelets.

Preferably, the composite material of the present invention exhibits a number of properties that allow it to be used in high-performance engineering applications. All measurements described herein are made at 25° C. and 1 atmosphere pressure of air unless otherwise stated and are carried out according to ASTM F2094-06 silicon nitride ball standard.

In particular, preferably the composite material has a strength (4-point bending strength, ASTM C1161) of 1300 MPa or more, such as 1300 MPa to 2500 MPa, more preferably 1400 MPa to 2000 MPa, more preferably 1500 MPa to 1600 MPa. This strength allow the materials to withstand general high stress levels in components while offering high production and application reliability.

Preferably, the fracture toughness (ASTM 01421) of the material is 5.0 $MPam^{1/2}$ or greater, such as 5 to 20 $MPam^{1/2}$, more preferably 7.5 to 15 $MPam^{1/2}$, more preferably 8 to 10 $MPam^{1/2}$. This toughness gives high defect tolerance and prevent catastrophic failure in use while offering high production and application reliability.

Preferably, the HV10 indentation hardness of the material is 1200 $kg/m^2$ or greater, such as 1400 to 2000 $kg/m^2$, more preferably 1500 to 1600 $kg/m^2$. This hardness contributes to withstanding particle contaminations by, for example, common quartz particles.

Preferably, the elastic modulus (EN 15335:2007) of the material is 330 MPa or less, such as 100 to 330 MPa, more preferably 200 to 300 MPa. This elastic modulus avoids high Heretzian contact stresses in the ball or roller or in the counterparts (raceways).

Turning to the manufacture of the material of the present invention, the ceramic material of the present invention may be manufactured using a number of techniques.

In particular, the zirconia matrix may be formed by a number of routes. For example, un-doped zirconia may be separately provided, mixed with a cerium source and an yttrium source and heated to the sintering temperature. Typical cerium and yttrium sources are their oxides ($CeO_2$ and $Y_2O_3$).

Alternatively, ceria-containing zirconia may be mixed with yttria-containing zirconia and heated to the sintering temperature.

Alternatively, the zirconia may be provided already containing both ceria and yttria.

The metal aluminate platelets may also be provided in a number of ways. They may be provided pre-formed in platelet form. Alternatively, a mixture of alumina and a metal source may be provided, such as a lanthanum source and/or a strontium source. Typical metal sources are their oxides. Then, when the alumina and the metal source are heated to the sintering temperature, platelets are formed in situ. The heating of the metal source with the alumina and, if applicable, the heating of the zirconia with the yttrium- and cerium-sources may be performed at the same time (i.e. having all the components pre-mixed) or may be performed separately and then combined and re-heated.

Whatever route taken, the zirconia/alumina mixture is typically heated to a sintering temperature. Typical sintering conditions are sintering at 1400 to 1700° C., such as 1450 to 1650° C., for example for 0.5 to 20 hours, such as 2 to 10 hours.

After sintering, the sintered material may be subject to Hot Isotatic Pressing (HIP) in order to remove any residual pores in the material. In particular, any residual porosity can result in a reduced strength and toughness. Therefore, after HIP, the density of the material is 98 to 100% of the theoretical density of the material, more preferably 990 or more and more preferably 99.5% or more.

Typical conditions for Hot Isotatic Pressing are 1400 to 1550° C., 1 to 2 bar pressure and a treatment (dwell) time of 0.5 to 10 hours.

The inventors have recognised that there a number of manufacturing techniques to manufacture the material of the present invention. In particular, the inventors have manufactured the material by slip casting. However, the inventors have found that, when manufactured by slip casting, in-homogeneous features such as residual pores remain and large grains are produced leading to variations in the fatigue-life behaviour with some tests showing very good results and some poor results.

The inventors have then found that a granulation method overcomes these problems. The method comprises:

spraying a slip comprising the un-sintered material through a nozzle to form droplets, freeze drying or spray drying these droplets to form granules, pressing the granules to form a green body, and sintering the green body.

This method is specifically adapted for use with the composition of the present invention but may also have advantageous results when used with other zirconia-alumina materials, such as those containing alumina platelets.

The un-sintered starting material used in this method comprises zirconia, alumina and metal aluminate platelets and/or a metal aluminate platelet precursor. If a metal aluminate precursor is provided, aluminate platelets are formed from the aluminate platelet precursor during the sintering of the green body. Examples of suitable precursors include strontium oxide and lanthanum oxide, which are thought to react with alumina during sintering to form metal aluminate platelets. Another example is $SrOZrO_2$, which undergoes the following chemical reaction with alumina on heating:

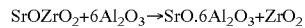

$$SrOZrO_2 + 6Al_2O_3 \rightarrow SrO \cdot 6Al_2O_3 + ZrO_2$$

Typically, the green body has a density of about 40 to 800 of its theoretical density, such as about 60%. Typically, sintering may be carried out in a temperature range of 1400 to 1800° C., such as 1500 to 1600° C. Typically, sintering may be carried out for a time of 0.5 to 20 hours, such as 2 to 10 hours. Sintering may be carried out in air.

Typically, the final product has a density of about 98 to 99% of the theoretical density of the material. A post-HIP cycle may then be applied on the composite to ensure closure of potential remaining pores.

The difference in microstructure between a slip casting product (FIG. 1) and a freeze-granulated product (FIG. 2) is demonstrated by the Figures. These figures show how the granulation method produces a pore-free and much more refined grain structure in the final product.

The present invention further provides a bearing component for a roller bearing, preferably a rolling element, at least part of which is formed from a ceramic material of the invention.

A bearing is a device that permits constrained relative motion between two parts. Bearings may be used in many different types of machinery to retain and support rotating components such as, for example, a wheel on a vehicle, a vane on a windmill or a drum in a washing machine. A rolling element bearing comprises inner and outer rings and a plurality of rolling elements (balls or rollers bearings).

Preferably, at least a rolling surface of the roller elements (e.g. balls or rollers) is formed from the ceramic material of the present invention. A rolling surface may be called a tribological surface or a wear surface. In use, a rolling surface is in contact with a second surface and, when the roller bearing is in operation, movement of the roller surface results in movement of the interfacing surface. In other words, a rolling surface is one of the functioning surfaces of the roller component.

The present invention also provides a roller bearing comprising this roller component.

The roller bearing of the present invention is preferably lubricated. Preferably, the lubricant comprises or consists of water. In particular, the inventors have found the composition of the present invention to exhibit hydrothermal and chemical stability that is advantageous in lubricated bearings, such as water-lubricated bearings.

In a preferred embodiment, the present invention provides for a "hybrid" bearing in which at least a rolling surface of the roller elements (eg balls or rollers) is made from the ceramic material of the present invention, while at least one of the inner and outer rings is made from a steel composition comprising (% by weight):

0.01-2 C
0.6-10 N
0.01-3.0 Si
0.01-10.0 Mn
16-30 Cr
0.01-5.0 Mo
0.01-15.0 V
0-5 Ni
0-5 Co
0-5 W
0-5 Ti
0-5 Zr
0-5 Al
0-0.5 S and the balance iron together with any unavoidable impurities.

The steel material for use in the "hybrid" bearing according to the present will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The steel material for use in the "hybrid" bearing according to the present invention preferably contains 0.05-1.5 C, more preferably 0.1-1.2 C, still more preferably 0.1-0.3 C.

The steel material preferably contains 0.6-7 N, more preferably 0.8-6 N, still more preferably 1-5 N.

The steel material preferably contains 0.05-2 Si, more preferably 0.1-1 Si, still more preferably 0.2-0.6 Si.

The steel material preferably contains 0.05-2 Mn, more preferably 0.1-1 Mn, still more preferably 0.2-0.6 Mn.

The steel material preferably contains 17-25 Cr, more preferably 18-24 Cr, still more preferably 19-23 Cr.

The steel material preferably contains 0.05-4 Mo, more preferably 0.1-3 Mo, still more preferably 0.5-2 Mo.

The steel material preferably contains 0.5-14 V, more preferably 1-12 V, still more preferably 2-10 V.

Ni, Co, W, Ti, Zr and Al are all optional alloying elements. The S content of the alloy preferably does not exceed 0.5% by weight.

Any unavoidable impurities are unlikely to constitute more than 0.5 weight % of the composition, preferably no more than 0.2 weight %.

A preferred steel composition comprises (% by weight):
0.05-0.5 C (preferably 0.1-0.3 C)
0.6-3 N (preferably 1-2 N)
0.05-1 Si (preferably 0.1-0.5 Si)
0.05-1 Mn (preferably 0.1-0.5 Mn)
16-24 Cr (preferably 18-22 Cr)
0.05-3 Mo (preferably 1-1.6 Mo)
0.05-5 V (preferably 1.5-4 V)
0-5 Ni (preferably 0-1 Ni)
0-5 Co (preferably 0-1 Co)
0-5 W (preferably 0-1 W)
0-5 Ti (preferably 0-1 Ti)
0-5 Zr (preferably 0-1 Zr)
0-5 Al (preferably 0-1 Al)
0-0.5 S (preferably 0-0.2 S)

and the balance iron together with any unavoidable impurities.

A suitable example of such a steel is Vanax 35 available from UDDEHOLM TOOLING AB and which comprises (% by weight): 0.2 C, 1.6 N, 0.3 Si, 0.3 Mn, 20.0 Cr, 1.3 Mo, and 2.8 V.

Another preferred steel composition comprises (% by weight):
0.05-0.5 C (preferably 0.1-0.3 C)
2-6 N (preferably 3-5 N)
0.05-1 Si (preferably 0.1-0.5 Si)
0.05-1 Mn (preferably 0.1-0.5 Mn)
17-25 Cr (preferably 19-23 Cr)
0.05-3 Mo (preferably 1-1.6 Mo)
6-12 V (preferably 7-11 V)
0-5 Ni (preferably 0-1 Ni)
0-5 Co (preferably 0-1 Co)
0-5 W (preferably 0-1 W)
0-5 Ti (preferably 0-1 Ti)
0-5 Zr (preferably 0-1 Zr)
0-5 Al (preferably 0-1 Al)
0-0.5 S (preferably 0-0.2 S)

and the balance iron together with any unavoidable impurities.

A suitable example of such a steel is Vanax 75 available from UDDEHOLM TOOLING AB and which comprises (% by weight): 0.2 C, 4.0 N, 0.3 Si, 0.3 Mn, 21.0 Cr, 1.3 Mo, and 9.0 V.

The steel for use in the bearing according to the present invention may consist essentially of the recited elements. It will therefore be appreciated that in addition to those elements that are mandatory other non-specified elements may be present in the composition provided that the essential characteristics of the composition are not materially affected by their presence.

The steel may be manufactured by a powder metallurgical process. Such a process is advantageous because it reduces the amount of oxide inclusions in the steel. The powder metallurgical manufacturing preferably comprises gas atomizing of a steel melt, with nitrogen as the atomizing gas, which will give the steel alloy a certain minimum content of nitrogen, solid phase nitration of the powder followed by consolidation by hot isostatic pressing. The steel can be used in this condition or after forging/rolling to final dimensions. The process may also involve hardening and tempering. The steels described herein and suitable heat treatments and processes for their manufacture are described in WO 2007/024192.

Suitable applications for the material of the present invention include rolling elements, cam followers, ball valves, gate valves, hip and joint replacements, teeth and bone replacement materials. In particular, the invention is suited to environments subject to corrosion stress cracking promoted by process medias such as body fluids, pre-treatment steps (e.g. sterilization), water or by lubricants.

EXAMPLES

The invention will now be illustrated with reference to a number of experimental results, which are provided by way of example and support:

Example 1

The compositions detailed in Table 1 were formed by slip-casting, heated under sintering conditions (1520° C. in air) and then subject to Hot Isotatic Pressing (HIP). Their properties were tested against a number of standards, in particular to test whether the material exhibits:
1. strength (MPa): measured by the 4-point bending test by ASTM F 2094-06 standard specification for silicon nitride ceramic balls, C1161 Test Method for Flexural Strength of Advanced Ceramics at ambient temperature (about 20° C.);
2. indentation toughness (MPam$^{1/2}$): measured by ASTM F 2094-06 standard specification for silicon nitride ceramic balls, 1421 Test Methods for Determination of Fracture Toughness of Advanced Ceramics at ambient temperature;
3. HV10 hardness (kg/mm$^2$): measured by ASTM F 204-06 standard specification for silicon nitride ceramic balls, C 1327 Test Method for Vickers Indentation Hardness of Advanced Ceramic;
4. elastic modulus (MPa): measured by Resonant Beam Technique, European Standard EN 15335:2007 Advanced technical ceramics—ceramic composites—elastic properties by resonant beam method up to 2000° C.;
5. water and steam resistance, in particular tested at 300° C., 86 bar, 9 days in an autoclave;
6. chemical resistance to strong acids and bases, separately tested in 37 w % HCl, 50 w % $H_2SO_4$ and 50 w % $H_3PO_4$, and 10M NaOH, each at 70° C. for 30 days;
7. low pressure rolling contact fatigue resistance in oil: tested by Polymet Rolling Contact Fatigue testing in oil under 2.0 GPa
8. high pressure rolling contact fatigue resistance in oil: tested by Polymet Rolling Contact Fatigue testing in oil under 4.5 GPa contact pressure
9. rolling contact fatigue resistance in water: tested by Polymet Rolling Contact Fatigue testing, using de-mineralised water under 4.5 GPa contact pressure.

The samples' properties relative to these standards are listed in Table 1:

TABLE 1

| Composition | A | B |
|---|---|---|
| (SKF Designation) | | (X1) |
| Composition before sintering | | |
| wt % $ZrO_2$ (stabilized with 12 mol % $CeO_2$; RMM = 129.09) | 0 | 68.7 |
| wt % $ZrO_2$ (stabilized with 3 mol % $Y_2O_3$; RMM = 126.30) | 60 | 0 |

TABLE 1-continued

| Composition | A | B |
|---|---|---|
| $Al_2O_3$ (wt %) | 40 | 29.5 |
| SrO•$ZrO_2$ (wt %) | 0 | 1.8 |
| Properties | | |
| 1: strength (MPa) | 1400 | 946 |
| 2: toughness (MPam$^{1/2}$) | 6.8 | 11.3 |
| 3: hardness (kg/mm$^2$) | 1500 | about 1380 |
| 4: elastic modulus (MPa) | 305 | <330 |
| 5: hydrothermal resistance test | Fail | Pass |
| 6: chemical resistance test | Fail | Pass |
| 7: low pressure rolling resistance test tin oil | Pass | Pass |
| 8: high pressure rolling resistance test in oil | Pass | Fail |
| 9: rolling resistance test in water | Pass | Fail |

It is apparent from Composition A in Table 1 that an yttrium-containing zirconia/alumina composite may not exhibit advantageous hydrothermal or chemical resistance properties.

It is also apparent from Composition B in Table 1 that a cerium-containing zirconia and a strontium-containing alumina of the type proposed in WO 90/11980 does not exhibit advantageous rolling properties desirable for a high-performance engineering material.

Example 2

The compositions detailed in Table 2 were formed by slip-casting, heated under sintering conditions (1520° C. in air) and then subject to HIP. Their properties were tested and are shown in Table 2.

TABLE 2

| Composition | B | C | D | E1 |
|---|---|---|---|---|
| (SKF Designation) | (X1) | (X3) | (X5) | (X2) |
| Composition before sintering | | | | |
| wt % $ZrO_2$ (stabilized with 12 mol % $CeO_2$; RMM = 129.09) | 68.7 | 54 | 49.1 | 39.2 |
| wt % $ZrO_2$ (stabilized with 3 mol % $Y_2O_3$; RMM = 126.30) | 0 | 14.7 | 19.6 | 29.5 |
| $Al_2O_3$ (wt %) | 29.5 | 29.5 | 29.5 | 29.5 |
| SrO•$ZrO_2$ (wt %) | 1.8 | 1.8 | 1.8 | 1.8 |
| Molar ratio of Y/Ce | 0 | 0.14 | 0.2 | 0.38 |
| Calculated composition after sintering | | | | |
| $ZrO_2$ matrix (including stabilizing elements, wt %) | 69.7 | 69.7 | 69.7 | 69.7 |
| $Al_2O_3$ (wt %) | 24.6 | 24.6 | 24.6 | 24.6 |
| SrO•6$Al_2O_3$ (wt %) | 5.7 | 5.7 | 5.7 | 5.7 |
| Calculated mol % of stabilizing elements in the $ZrO_2$ matrix: | | | | |
| $CeO_2$ | 11.8 | 9.3 | 8.4 | 6.7 |
| $Y_2O_3$ | 0 | 0.64 | 0.86 | 1.3 |
| Properties | | | | |
| Strength (4-point bending test, MPa) | 946 | 1025 | 1353 | 1548 |
| Toughness (SENB, MPam$^{1/2}$) | 11.3 | 19.6 | 8.6 | 8.9 |

Table 2 shows that the substitution of a proportion of the cerium-containing zirconia starting material for yttrium-containing zirconia results in a significant increase in the strength of the zirconia-alumina composite without a significant loss of toughness.

Example 3

The compositions detailed in Table 3 were formed by slip casting, heated under sintering conditions (1520° C. in air) and then subject to HIP. Their properties were then tested and are shown in Table 3 below:

TABLE 3

| Composition | F | G | E1 |
|---|---|---|---|
| (SKF Designation) | (X4) | (X6) | (X2) |
| Composition before sintering | | | |
| wt % $ZrO_2$ (stabilized with 12 mol % $CeO_2$; RMM = 129.09) | 39.3 | 39.3 | 39.2 |
| wt % $ZrO_2$ (stabilized with 3 mol % $Y_2O_3$; RMM = 126.30) | 9.8 | 19.6 | 29.5 |
| $Al_2O_3$ (wt %) | 49.1 | 39.3 | 29.5 |
| SrO•$ZrO_2$ (wt %) | 1.8 | 1.8 | 1.8 |
| Molar ratio of Y/Ce | 0.13 | 0.25 | 0.38 |
| Calculated composition after sintering | | | |
| $ZrO_2$ matrix (including stabilizing elements, wt %) | 50.1 | 59.9 | 69.8 |
| $Al_2O_3$ (wt %) | 44.2 | 34.4 | 24.6 |
| SrO•6$Al_2O_3$ (wt %) | 5.7 | 5.7 | 5.7 |
| Calculated mol % of stabilizing elements in the $ZrO_2$ matrix: | | | |
| $CeO_2$ | 9.4% | 7.8% | 6.7% |
| $Y_2O_3$ | 0.60% | 1.0% | 1.3% |
| Properties | | | |
| Strength (4-point bending test, MPa) | 1211 | 1337 | 1548 |
| Toughness (SENB, MPam$^{1/2}$) | 15.7 | 8.4 | 8.9 |

Table 3 shows that the substitution of a proportion of the alumina with yttrium-containing zirconia results in a significant increase in the strength of the zirconia-alumina composite without a significant loss of toughness.

Example 4

The chemical composition detailed in Table 4 as 'E1' was sprayed through a nozzle to form droplets. The droplets were then freeze-dried to form granules. The granules were then compressed to form a green body, which was sintered at 1520° C. in air and then subject to HIP. Its properties were then tested and are shown in Table 4 below:

TABLE 4

| Composition | E2 |
|---|---|
| Composition before sintering | |
| wt % $ZrO_2$ (stabilized with 12 mol % $CeO_2$; RMM = 129.09) | 39.2 |
| wt % $ZrO_2$ (stabilized with 3 mol % $Y_2O_3$; RMM = 126.30) | 29.5 |
| $Al_2O_3$ (wt %) | 29.5 |
| SrO•6$Al_2O_3$ (wt %) | 1.8 |
| Properties | |
| 1: strength (MPa) | 1348 |
| 2: toughness (MPam$^{1/2}$) | 7.7-8.1 |
| 3: hardness (kg/mm$^2$) | 1397-1412 |
| 4: elastic modulus (MPa) | 272 |
| 5: hydrothermal resistance test | Pass |
| 6: chemical resistance test | Pass |
| 7: low pressure rolling resistance test tin oil | Pass |
| 8: high pressure rolling resistance test in oil | Pass |
| 9: rolling resistance test in water | Pass |

It was particularly noted how E2 performed better in the rolling contact fatigue resistance test than E1 despite having the same chemical composition. This improvement in properties was accompanied by a change in microstructure. In particular, the microstructure of example E2 was compared with the microstructure of example E1 by electron micrograph and the results are shown in FIGS. 1 and 2.

The invention claimed is:

1. A roller bearing comprising an inner ring, and outer ring, and at least one rolling element, a rolling surface of which is formed from a ceramic material,
  wherein said ceramic material consists essentially of 50 to 75 wt % of a zirconia matrix of zirconia, yttrium and cerium, 25 to 49.5 wt % of alumina, 0.5 to 5 wt % of metal aluminate platelets, and any unavoidable impurities, and
  wherein the yttrium and cerium are present in the zirconia matrix in a molar ratio of 0.15 to 0.5 and in a combined amount of 5 to 15 mol %.

2. The roller bearing according to claim 1, wherein the alumina and the metal aluminate platelets are present in the ceramic material in a weight ratio of 5:1 to 20:1.

3. The roller bearing according to claim 1, wherein the metal aluminate platelets contain an alkaline earth aluminate and/or a lanthanoid aluminate.

4. The roller bearing according to claim 1, wherein the metal aluminate platelets contain strontium aluminate and/or lanthanum aluminate.

5. The roller bearing according to claim 1, wherein the zirconia matrix is a composite of yttrium-containing zirconia and cerium-containing zirconia.

6. The roller bearing according to claim 1, wherein the inner ring and/or outer ring is made from a steel composition comprising:
  0.01-2 wt % C,
  0.6-10 wt % N,
  0.01-3.0 wt % Si,
  0.01-10.0 wt % Mn,
  16-30 wt % Cr,
  0.01-5.0 wt % Mo,
  0.01-15.0 wt % V,
  0-5 wt % Ni,
  0-5 wt % Co,
  0-5 wt % W,
  0-5 wt % Ti,
  0-5 wt % Zr,
  0-5 wt % Al,
  0-0.5 wt % S,
  and the balance iron together with any unavoidable impurities.

7. The roller bearing according to claim 6, wherein the roller bearing is lubricated.

8. The roller bearing according to claim 6, wherein the roller bearing is lubricated by water.

9. The roller bearing according to claim 1, wherein the metal aluminate platelets contain strontium hexaaluminate (SrO.6$Al_2O_3$).

10. The roller bearing according to claim 1, wherein the metal aluminate platelets contain strontium aluminate.

* * * * *